US012632382B2

(12) United States Patent
Chen et al.

(10) Patent No.: US 12,632,382 B2
(45) Date of Patent: May 19, 2026

(54) MITIGATION OF GARBAGE COLLECTION OVERHEAD

(71) Applicant: Red Hat, Inc., Raleigh, NC (US)

(72) Inventors: Huamin Chen, Westboro, MA (US);
Chen Wang, Chappaqua, NY (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/983,859

(22) Filed: Nov. 9, 2022

(65) Prior Publication Data

US 2024/0152453 A1     May 9, 2024

(51) Int. Cl.
    *G06F 12/00*      (2006.01)
    *G06F 11/34*      (2006.01)
    *G06F 12/02*      (2006.01)

(52) U.S. Cl.
    CPC ...... *G06F 12/0253* (2013.01); *G06F 11/3452* (2013.01)

(58) Field of Classification Search
    None
    See application file for complete search history.

(56) References Cited

U.S. PATENT DOCUMENTS

| | | | | |
|---|---|---|---|---|
| 7,506,317 B2 * | 3/2009 | Liang | .................. | G06F 11/3466 |
| | | | | 718/1 |
| 7,624,137 B2 * | 11/2009 | Bacon | ................. | G06F 12/0253 |
| | | | | 711/170 |

| | | | | |
|---|---|---|---|---|
| 7,716,451 B2 * | 5/2010 | Creamer | ............. | G06F 12/0253 |
| | | | | 703/22 |
| 7,996,446 B2 * | 8/2011 | Bacon | ................. | G06F 12/0253 |
| | | | | 707/816 |
| 9,606,820 B2 * | 3/2017 | Daudel | ............... | G06F 12/0253 |
| 9,798,629 B1 * | 10/2017 | Shilane | ............... | G06F 11/1466 |
| 10,509,581 B1 * | 12/2019 | Abrol | .................... | G06F 3/0688 |
| 10,678,687 B2 * | 6/2020 | Na | ......................... | G06F 3/0679 |
| 11,102,282 B2 | 8/2021 | Chatt et al. | | |
| 2005/0149585 A1 * | 7/2005 | Bacon | ................. | G06F 12/0253 |
| 2005/0289307 A1 * | 12/2005 | Achanta | .............. | G06F 12/0253 |
| | | | | 711/170 |
| 2007/0260843 A1 * | 11/2007 | Creamer | ............. | G06F 11/3428 |
| | | | | 711/170 |
| 2009/0055615 A1 * | 2/2009 | Creamer | ............. | G06F 12/0253 |
| | | | | 711/170 |
| 2009/0300086 A1 * | 12/2009 | Bacon | ................. | G06F 12/0253 |
| | | | | 711/170 |
| 2014/0040591 A1 * | 2/2014 | Gounares | ................ | G06F 8/311 |
| | | | | 711/171 |

(Continued)

OTHER PUBLICATIONS

Suo, Kun, "Characterizing and Optimizing the Performance of Virtualized Network Systems in the Cloud," PhD Dissertations— Univ. of Texas—Arlington; May 11, 2022—2 pages. http://hdl. handle.net/10106/28615.

(Continued)

*Primary Examiner* — Farhan M Syed
(74) *Attorney, Agent, or Firm* — Womble Bond Dickinson (US) LLP

(57)                    ABSTRACT

A method includes collecting resource utilization statistics associated with execution of an application, identifying calls to a function associated with management of the application, and adjusting an allocation of computing resources for executing the application in view of the resource utilization statistics and the calls to the function.

20 Claims, 9 Drawing Sheets

(56)        References Cited

U.S. PATENT DOCUMENTS

| | | | |
|---|---|---|---|
| 2015/0121029 A1* | 4/2015 | Declercq | G06F 11/3037 |
| | | | 711/170 |
| 2015/0381453 A1* | 12/2015 | Skjolsvold | G06F 9/505 |
| | | | 709/224 |
| 2016/0285711 A1* | 9/2016 | Akidau | H04L 47/28 |
| 2018/0067856 A1* | 3/2018 | Walker | G06F 12/0871 |
| 2018/0322064 A1* | 11/2018 | Poxon | G06F 8/443 |
| 2019/0205250 A1* | 7/2019 | Fang | G06F 9/445 |
| 2021/0055862 A1 | 2/2021 | Mulholland et al. | |
| 2021/0352044 A1 | 11/2021 | Asveren et al. | |
| 2022/0027379 A1 | 1/2022 | Unterbrunner et al. | |
| 2023/0033562 A1* | 2/2023 | Jeong | G06F 12/02 |

OTHER PUBLICATIONS

Nisbet, Andy et al.; "Profiling and Tracing Support for Java Applications," Tenth ACM/SPEC Intl. Conf. on Performance Engineering (ICPE '19), Apr. 7-11, 2019, Mumbai, India; 9 pages. https://doi.org/10.1145/3297663.3309677.

* cited by examiner

100

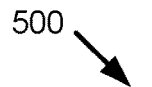
500
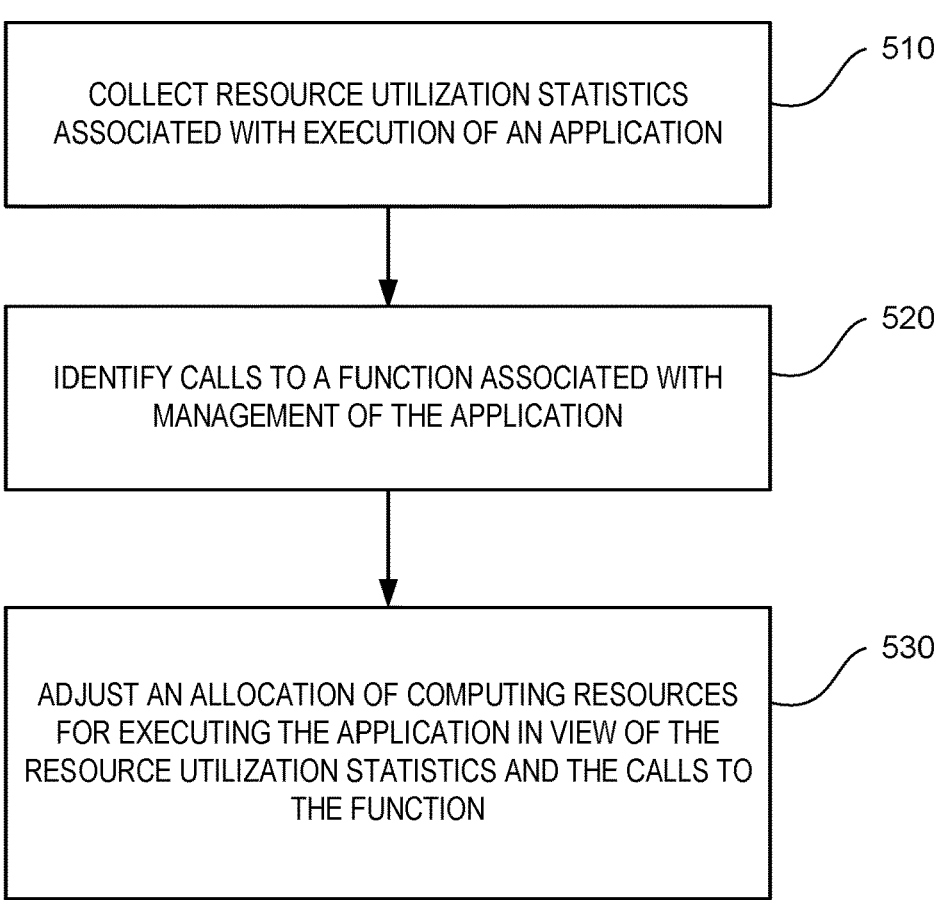
COLLECT RESOURCE UTILIZATION STATISTICS ASSOCIATED WITH EXECUTION OF AN APPLICATION
510
IDENTIFY CALLS TO A FUNCTION ASSOCIATED WITH MANAGEMENT OF THE APPLICATION
520
ADJUST AN ALLOCATION OF COMPUTING RESOURCES FOR EXECUTING THE APPLICATION IN VIEW OF THE RESOURCE UTILIZATION STATISTICS AND THE CALLS TO THE FUNCTION
530
FIG. 5

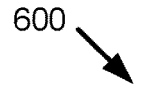
600
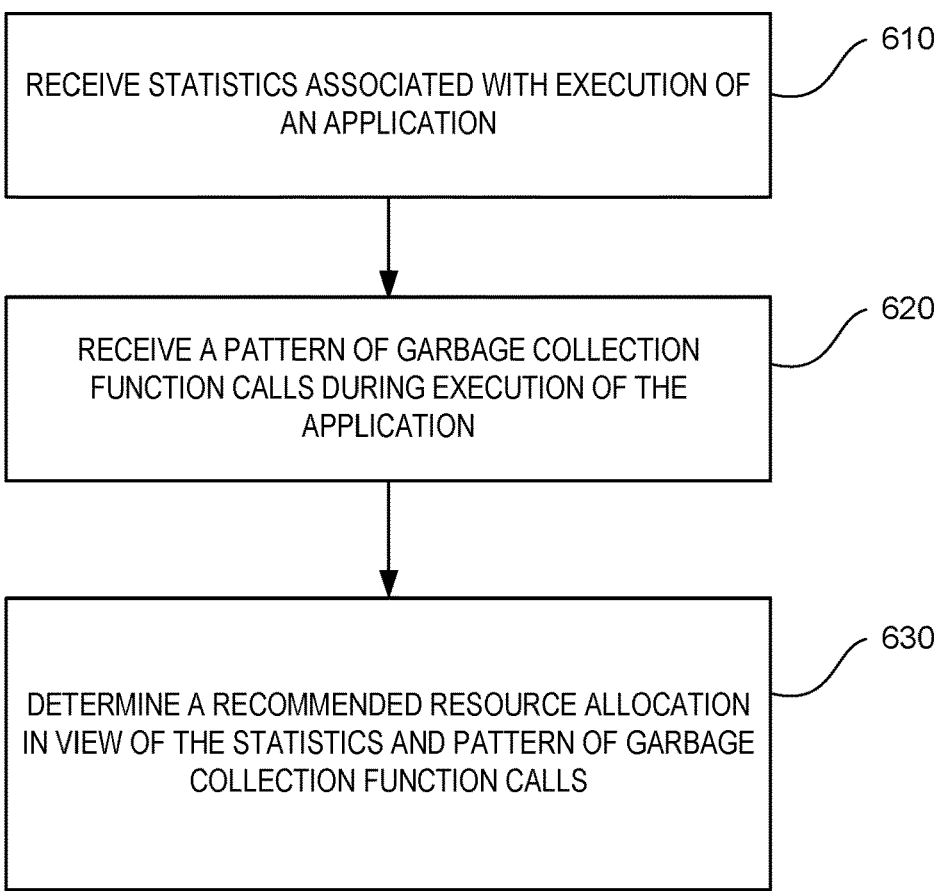
610
RECEIVE STATISTICS ASSOCIATED WITH EXECUTION OF AN APPLICATION
620
RECEIVE A PATTERN OF GARBAGE COLLECTION FUNCTION CALLS DURING EXECUTION OF THE APPLICATION
630
DETERMINE A RECOMMENDED RESOURCE ALLOCATION IN VIEW OF THE STATISTICS AND PATTERN OF GARBAGE COLLECTION FUNCTION CALLS
FIG. 6

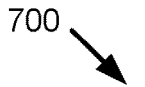

700

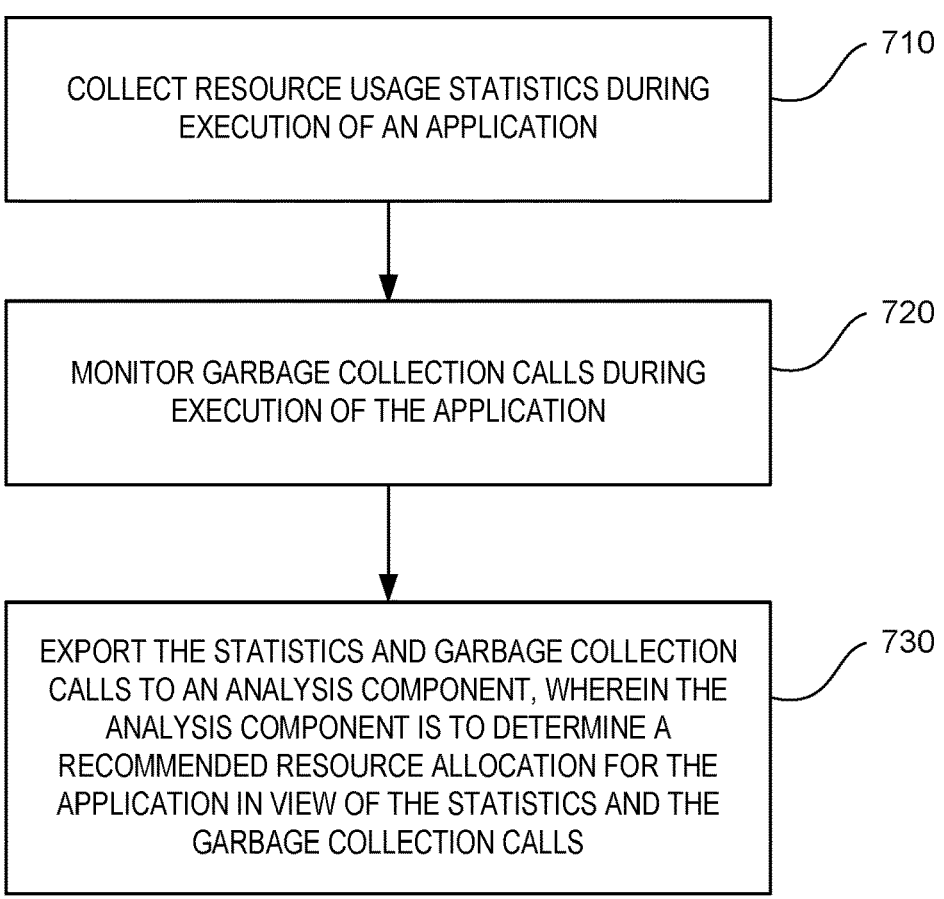

COLLECT RESOURCE USAGE STATISTICS DURING EXECUTION OF AN APPLICATION — 710

MONITOR GARBAGE COLLECTION CALLS DURING EXECUTION OF THE APPLICATION — 720

EXPORT THE STATISTICS AND GARBAGE COLLECTION CALLS TO AN ANALYSIS COMPONENT, WHEREIN THE ANALYSIS COMPONENT IS TO DETERMINE A RECOMMENDED RESOURCE ALLOCATION FOR THE APPLICATION IN VIEW OF THE STATISTICS AND THE GARBAGE COLLECTION CALLS — 730

FIG. 7

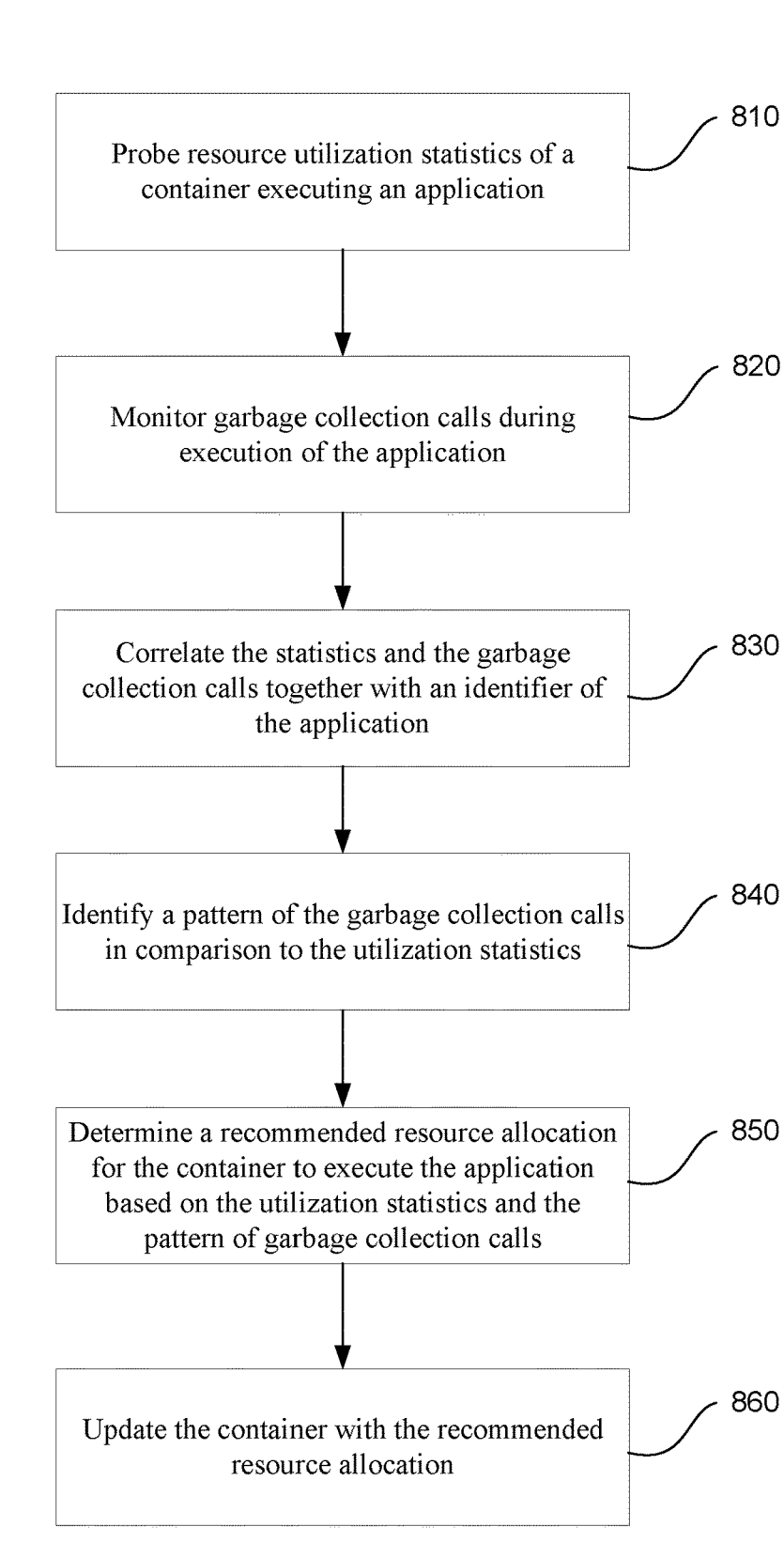

800

Probe resource utilization statistics of a container executing an application — 810

Monitor garbage collection calls during execution of the application — 820

Correlate the statistics and the garbage collection calls together with an identifier of the application — 830

Identify a pattern of the garbage collection calls in comparison to the utilization statistics — 840

Determine a recommended resource allocation for the container to execute the application based on the utilization statistics and the pattern of garbage collection calls — 850

Update the container with the recommended resource allocation — 860

FIG. 8

MITIGATION OF GARBAGE COLLECTION OVERHEAD

TECHNICAL FIELD

Aspects of the present disclosure relate to cloud native application execution, and more particularly, to mitigating garbage collection overhead in cloud native applications.

BACKGROUND

Cloud-native applications, or otherwise serverless application platforms execute applications in virtualized environments. The virtualized environments include isolated execution environments with an allocation of computing resources for executing a task, portion of an application, or an entire application. The allocated resources may be based on the requirements of the associated task to be executed or may be pre-defined allocations.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 5 is a flow diagram of a method of resource allocation adjustment for mitigating garbage collection overhead, in accordance with some embodiments.

FIG. 6 is a flow diagram of a method of recommending resource allocation to mitigate garbage collection overhead, in accordance with some embodiments.

FIG. 7 is a flow diagram of a method of collecting information for mitigating garbage collection overhead, in accordance with some embodiments.

FIG. 8 is a flow diagram of a method of mitigating garbage collection overhead by recommending resource allocation based on garbage collection call information, in accordance with some embodiments.

DETAILED DESCRIPTION

Figure 1:
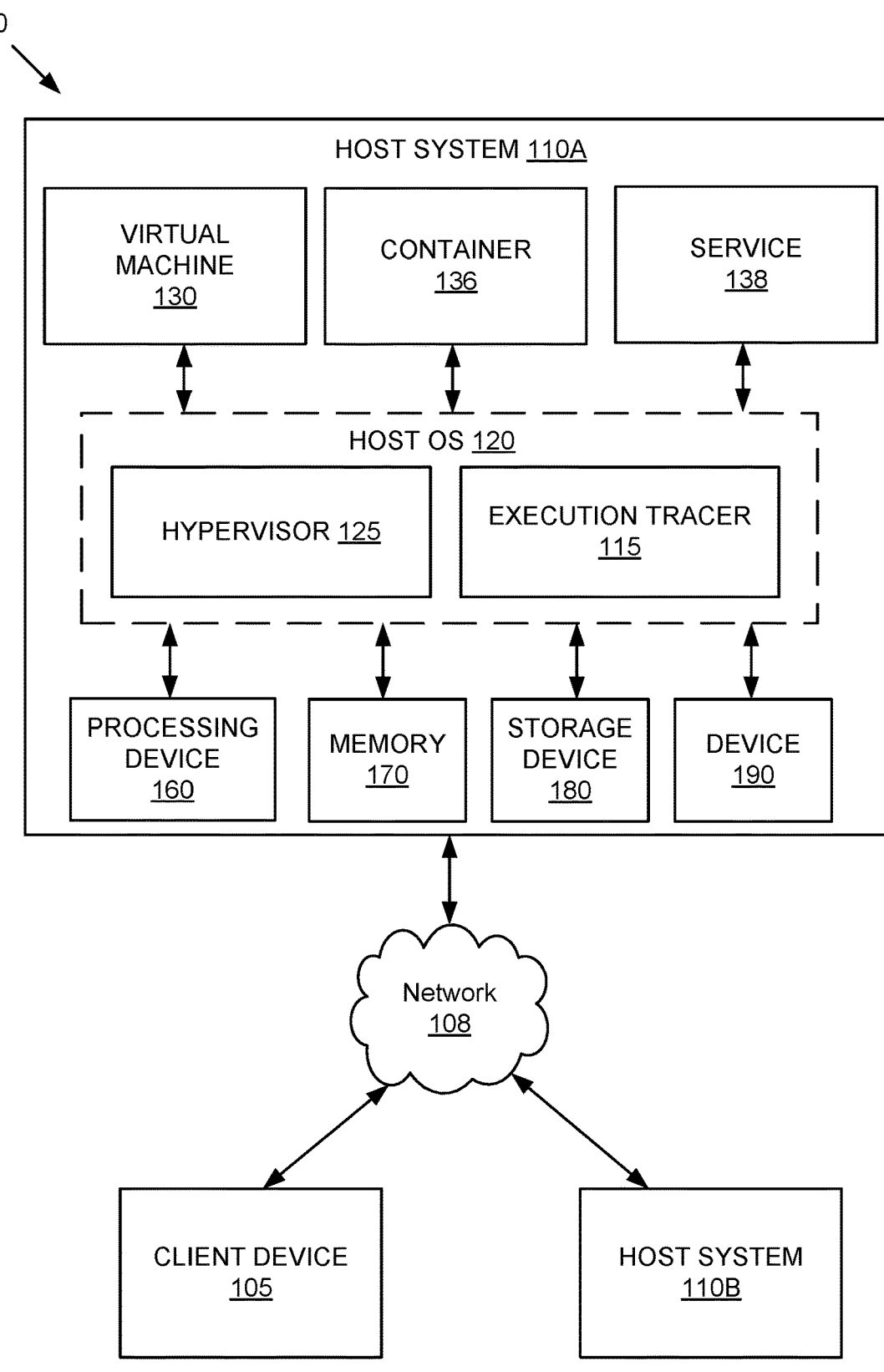
FIG. 1 is a block diagram that illustrates an example computer system architecture, in accordance with some embodiments.

In a container orchestration system, a container is an isolated execution environment to which computing resources are allocated to execute one or more processes. A collection of containers, herein referred to as a pod, may include a collection of multiple containers for execution a workload, such as an application. Containers may be used to support a cloud computing infrastructure. Cloud native applications may be written in different programming languages such as Go, Python, Java, and Javascript. These languages may include garbage collection operations which identify and reallocate memory for applications written in these languages. Accordingly, these languages are subject to garbage collection overhead. Garbage collection operations use computing resources, such as processing cycles and memory to execute and the application itself may be paused during execution of the garbage collection operation. Accordingly, garbage collection overhead can result in unplanned performance degradations when garbage collection kicks in, particularly when utilization of the resources allocated to the applications pod and/or containers is high. For example, high memory utilization may result in many calls to the garbage collection operation or high processor utilization may result in longer execution time for the garbage collection operation.

In conventional container orchestration systems, resource allocation to containers of a pod may be performed by a type of autoscaler which determines whether resource allocation for an application should be adjusted for better performance and efficient resource allocation. However, conventional autoscalers do not consider garbage collection calls when determining resource allocation and whether resource allocation should be adjusted. Rather, current autoscaler resource allocation is based on runtime memory usage and processor utilization. Additionally, conventional garbage collection mitigation solutions are based on profiling within a particular runtime environment such that the solution cannot be dispatched to different software or hardware environments or specifications. Thus, conventional resource allocation and garbage collection mitigation for container orchestration systems lack the flexibility and accuracy to address garbage collection overhead across languages and platforms.

Aspects of the disclosure address the above-noted and other deficiencies by providing a custom instrumentation and autoscaler to mitigate garbage collection overhead for repetitive workloads, such as serverless workloads. For example, a tracing component (e.g., an eBPF based tracer) may capture both kernel and user space events including function calls (e.g., garbage collection function calls). The tracer may correlate metadata (e.g., resource utilization) of a pod and containers of the pod with the captured function calls and export the data for external analysis. An analysis component may receive the data, including the resource utilization data and the garbage collection function calls and determine a root cause of garbage collection inducted pauses of an application executed by the pod. In some examples, the analysis component may determine whether the garbage collection calls are being caused by insufficient memory or insufficient processing cycles for the pod. The analysis component may recommend an update to the computing resources allocated to the pod.

In some examples, a low overhead and non-intrusive tracer is deployed on the compute node (e.g., hardware or virtual compute node). The tracer may capture software and hardware statistics along with program function calls from a workload executed on the compute node. The software and hardware statistics may include, for example, processing cycles, cache and memory load instructions. The program function calls may include, for example, garbage collection call entry and exit. In some examples, the software and hardware statistics may be collected between garbage collection function calls and during the entire lifecycle of the application container.

The collected statistics may be correlated with the pod metadata of the application container including, for example, the name and namespace of the container. The tracer may export the collected statistics and function calls to the analysis component along with the identifiers of the container to allow the analysis component to recommend resource allocation for the container to the container orchestration system. In some embodiments, the analysis component may identify patterns associated with the garbage collection calls. In some examples, the analysis component may determine patterns of the garbage collection calls with respect to the collected statistics. For example, the analysis component may determine if the garbage collection calls occur frequently with a short duration which may indicate that additional memory should be allocated to the container or if the garbage collection calls occur infrequently but for a long duration. The terms short duration and long duration for execution of the garbage collection function may be determined with respect to a threshold length of time or in comparison to similar workloads (e.g., benchmark workloads). Similarly, the terms frequent and infrequent may be determined with respect to a threshold rate or interval or in comparison to similar workloads. In some examples, the analysis component may filter out garbage collection calls based on the collected statistics (e.g., if the garbage collection call occurs during a period of low resource utilization and is thus not indicative of resource limitations). Upon identifying the pattern of garbage collection calls, the analysis component may determine a recommended resource allocation update for the container and/or pod. The analysis component may provide the recommended resource allocation update to the container orchestration system (e.g., an autoscaler of the container orchestration system) to adjust the container and/or pod resources.

Therefore, unlike conventional autoscalers of serverless architectures, the tracer and analysis component of the present disclosure provide for language agnostic statistics collection and function call monitoring. Additionally, the analysis component more accurately identifies resource limitations of pods and/or containers by identifying patterns associated with garbage collection calls that indicate performance impacts due to garbage collection overhead.

By analyzing resource constraints in view of garbage collection calls, embodiments of the present disclosure may significantly improve resource allocation and application performance. Garbage collection overhead can be mitigated by determining if and which resources are limited during garbage collection calls and thus more appropriately recommend allocation of resources for enhancing overall application performance.

Although aspects of the disclosure may be described in the context of a container orchestration system, embodiments of the disclosure may be applied to any computing system that allocates resources for executing processes or software applications.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and client device 105. The host systems 110A-B include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A. It should be noted that although, for simplicity, host system 110A is depicted as including a single processing device 160, storage device 180, and device 190 in FIG. 1, other embodiments of host systems 110A may include a plurality of processing devices, storage devices, and devices. Similarly, client device 105 and host system 110B may include a plurality of processing devices, storage devices, and devices. The host systems 110A-B and client device 105 may each be a server, a mainframe, a workstation, a personal computer (PC), a mobile phone, a palm-sized computing device, etc. In embodiments, host systems 110A-B may be separate computing devices. In some embodiments, host systems 110A-B may be included in a cluster of computing devices. For clarity, some components of client device 105 and host system 110B are not shown. Furthermore, although computer system architecture 100 is illustrated as having two host systems, embodiments of the disclosure may utilize any number of host systems. For example, computer system architecture 100 may include a cluster of computing nodes in which host systems 110A-B are included.

Host system 110A may additionally include one or more virtual machines (VMs) 130, containers 136, and host operating system (OS) 120. VM 130 is a software implementation of a machine that executes programs as though it were an actual physical machine. Container 136 acts as an isolated execution environment for different functions of applications. The VM 130 and/or container 136 may be an instance of a serverless application or function for executing one or more applications of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110A-B and client device 105 may be coupled (e.g., may be operatively coupled, communicatively coupled, may communicate data/messages with each other) via network 108. Network 108 may be a public network (e.g., the internet), a private network (e.g., a local area network (LAN) or wide area network (WAN)), or a combination thereof. In one embodiment, network 108 may include a wired or a wireless infrastructure, which may be provided by one or more wireless communications systems, such as a WiFi™ hotspot connected with the network 108 and/or a wireless carrier system that can be implemented using various data processing equipment, communication towers (e.g., cell towers), etc. The network 108 may carry communications (e.g., data, message, packets, frames, etc.) between the various components of host systems 110A-B and/or client device 105. In some embodiments, host system 110A and 110B may be a part of a computing cluster of a computing platform (e.g., PaaS system).

In some examples, host system 110A may be instrumented with an execution tracer 115 to monitor resource usage statistics and function calls of applications, containers, VMs, services, etc. executed by the host system 110A. The execution tracer 115 may be software, such as eBPF, that sits between the user space applications and the kernel of the host OS 120 and may probe for information from either domain. In some examples, the execution tracer 115 may collect metadata such as resource utilization statistics of containers (or other virtualized environments) executing a process or application and function calls of the process or application. The execution tracer 115 may also correlate the resource utilization statistics and monitored function calls with the metadata of the container (e.g., name, identifier, etc.) and export the statistics to an external analysis component, as described in more detail with respect to FIGS. 2-3 (e.g., external to the container, pod, or other virtual environment). The analysis component may then determine whether to update resource allocation to the container based on the garbage collection calls and the resource utilization characteristics. Further details regarding the execution tracer 115 and the analysis component will be discussed at FIGS. 2-8 below.

Figure 2:
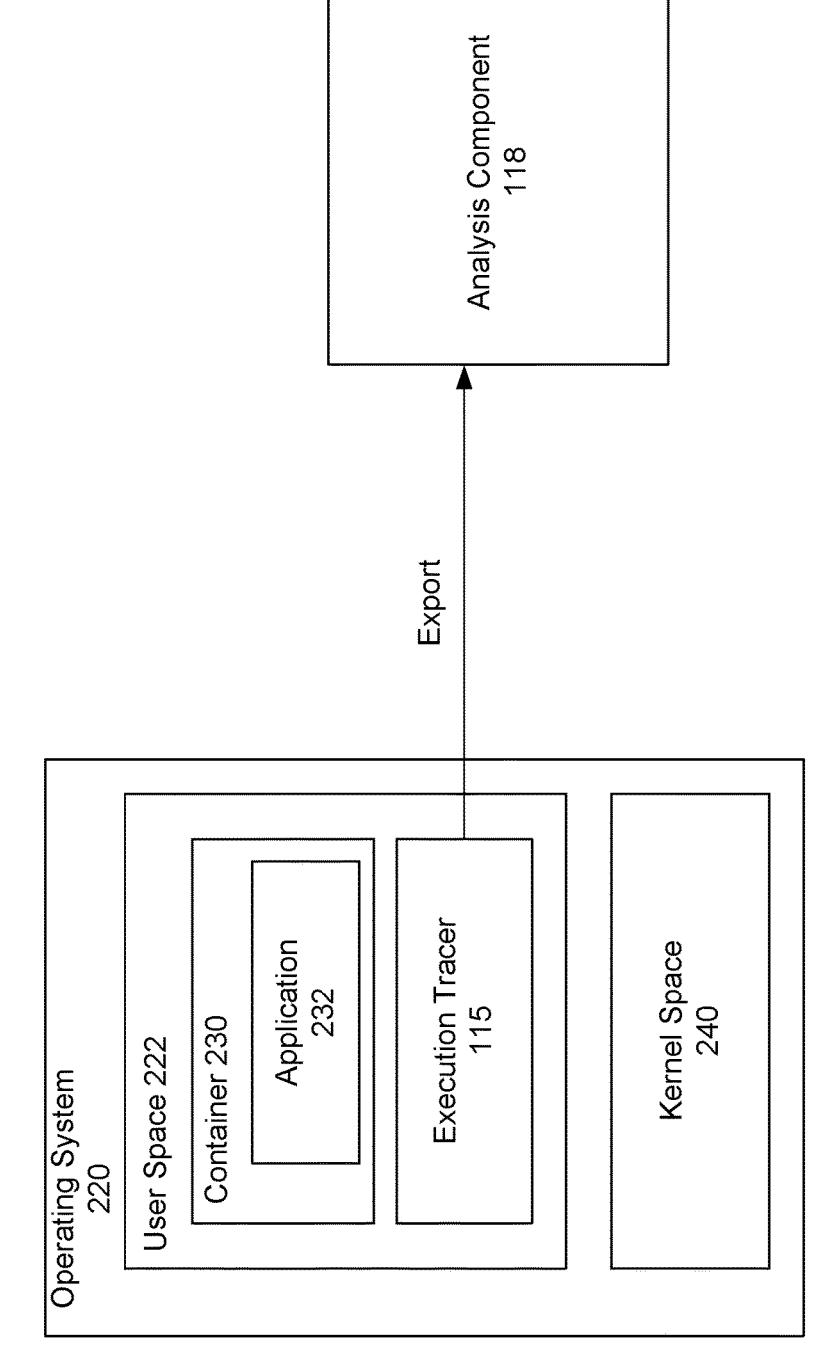
FIG. 2 is an illustration of an example system for mitigating garbage collection overhead, in accordance with embodiments of the disclosure.

FIG. 2 is an illustration of an example system 200 for mitigating garbage collection overhead, in accordance with embodiments of the disclosure.

Referring to FIG. 2, the system 200 includes an operating system 220 executing on a computing node 210. The operating system 220 may include a user space 222 in which one or more containers 230 execute one or more applications 232. For ease of description, examples describe one or more containers. However, embodiments may operate with respect to any execution environment, such as a virtual machine (VM), pod, service, container within a VM, etc. The user space 222 may include a domain in which user applications execute. The operating system 220 may further include a kernel space 240 responsible for background processes, resource allocation for user space processes, and resource management. In some examples, an execution tracer 115 is executed by the operating system 220 within the user space 222. In other examples, the execution tracer 115 may operate external to the operating system 220. The execution tracer 115 may monitor execution of the container 230 and the application 232. For example, the execution tracer 115 may monitor the utilization of resources assigned to the container 230 as the application 232 executes within the container 230. Additionally, the execution tracer 115 may monitor function calls by the application 232. For example, the execution tracer 115 may monitor garbage collection function calls to the kernel space 240 for managing memory allocation associated with the application 232. The garbage collection function calls may free up memory of the container 230 that is no longer being used by the application 232 or that is less important than other requested uses of the memory that is allocated to the container.

In some examples, the execution tracer 115 may associate the collected statistics and function calls with an identifier and other metadata of the container 230 and export the statistics and function calls to an analysis component 118 that is external to the container 230. The analysis component 118 may receive the statistics and function calls and determine whether the allocation of resources to the container 230 should be updated. For example, the analysis component 118 determines whether the function calls include a pattern of garbage collection calls at high resource utilization rates that indicate that more resources should be allocated to the container. The analysis component 118 may then determine a recommended resource allocation for the container 230 based on pattern of garbage collection calls and the resource usage statistics. For example, if the analysis component 118 determines that the garbage collection calls occur for a short period of time at frequent intervals, then the container 230 may have a shortage of memory. The shortage of memory may cause several calls to the garbage collection function to free up memory to perform addition tasks of the workload. The analysis component 118 may then recommend an updated resource allocation for the container 230 with a larger amount of memory allocation. In another example, if the analysis component determines that the garbage collection calls occur infrequently but take a large amount of time to execute then the container 230 may have a shortage of allocated processing resources (e.g., CPU cycles). The analysis component 118 may then provide a recommended resource allocation with an increase to the amount of allocated processing resources. Further description of determination of the resource allocation recommendation is provided below with respect to FIG. 3.

Figure 3:
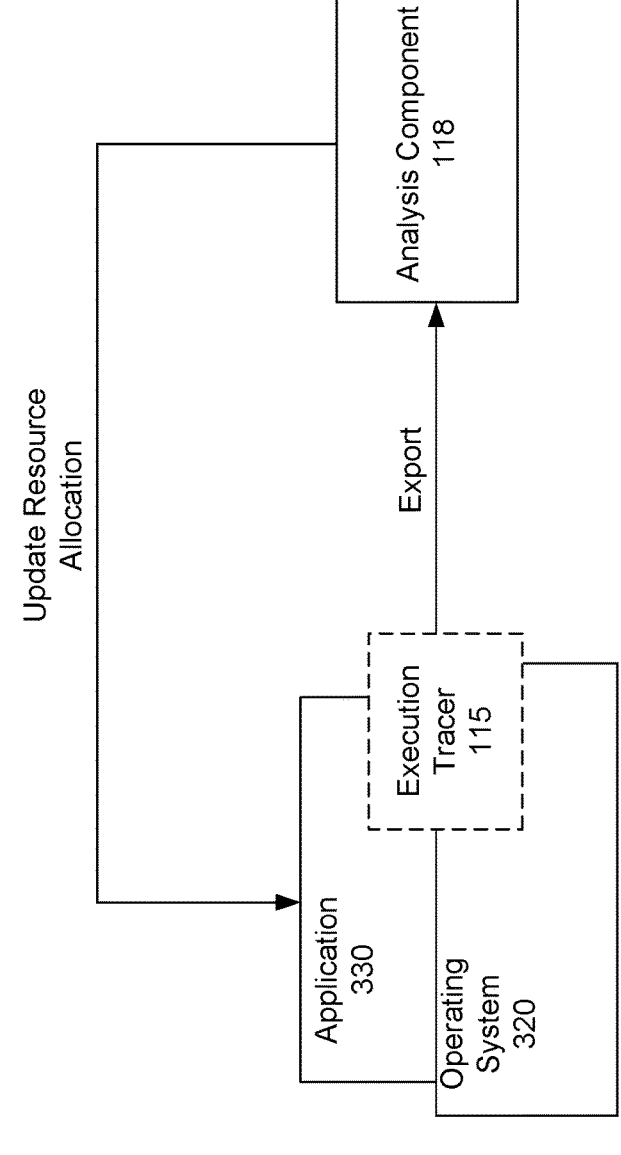
FIG. 3 is an illustration of another example system for mitigating garbage collection overhead during execution of a containerized application, in accordance with embodiments of the disclosure.

FIG. 3 is an illustration of another example system 300 for mitigating garbage collection overhead in virtualized environments, in accordance with embodiments of the present disclosure. The system 300 includes an application 330 executing on an operating system 320 and an execution tracer 115 operating between the application 330 and the operating system 320. The system further includes an analysis component 118 to receive and analyze collected metrics from the execution tracer 115. Execution tracer 115 may collect resource usage information for the application 330 which may execute within a container as described with respect to FIG. 2. The resource usage information may include an amount of each computing resource utilized by the application 330 during execution. For example, the resource usage information may include a number of CPU cycles used by the application 330 within a time span and memory usage and allocation at any given time during execution of the application 330.

In one embodiment, the execution tracer 115 may monitor and identify garbage collection function calls without collecting and correlating resource usage statistics. The execution tracer 115 may then export the garbage collection function calls to the analysis component along with an identifier and any other identifying metadata associated with the application 330. The analysis component 118 may determine whether the garbage collection function calls occur in a pattern that indicates a resource limitation. For example, many garbage collection calls in a short period may indicate to the analysis component 118 that CPU allocation is limited and should be increased while a few longer garbage collection calls (e.g., longer time to perform the garbage collection task) indicates limited memory allocation. The analysis component 118 may then recommend or update the resource allocation of the container of the application container.

In another embodiment, the execution tracer 115 may collect resource usage statistics for the application 330 as well as garbage collection function calls. The execution tracer 115 may correlate the resource usage statistics together with the garbage collection function calls and export both to the analysis component 118. In addition to identifying potential resource limitations based on the garbage collection calls, the analysis component 118 may also determine if the potential resource limitations correlate to high resource usage of the application 330. For example, the analysis component 118 may filter out garbage collection calls that occur when the statistics indicate that resource utilization of the application 330 is low (e.g., with respect to the resources currently allocated to the application container). In some examples, the analysis component 118 may filter out the garbage collection calls that occur when resource usage for each resource is below a particular threshold usage (e.g., 80%, 90%, etc.) A different threshold may be used for each of the different resources. Accordingly, the analysis component 118 may use both the garbage collection calls and the resource usage statistics of the application 330 to more accurately determine and adjust allocation of resources to containers.

Figure 4:
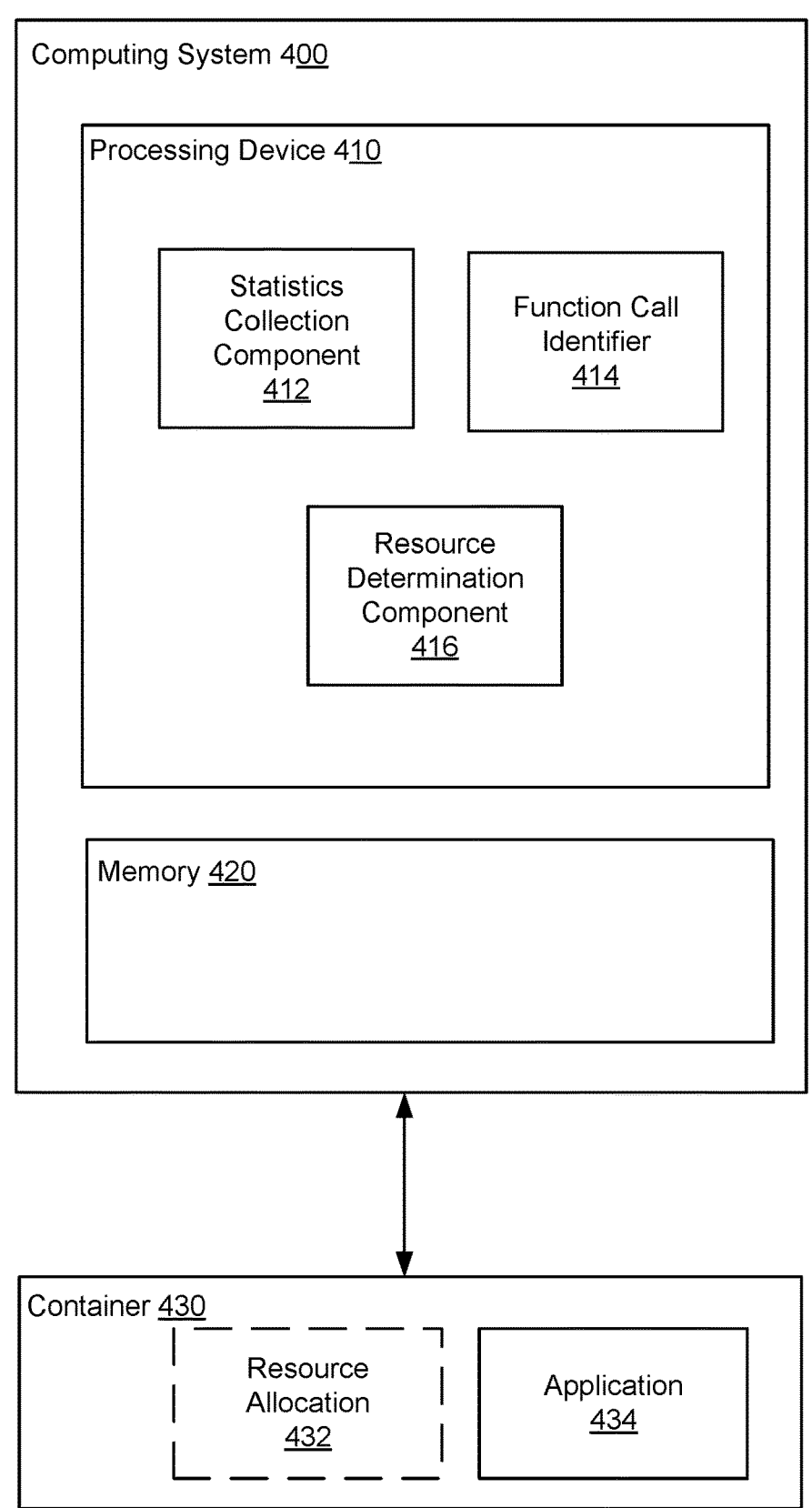
FIG. 4 is an illustration of an example computing system with garbage collection overhead mitigation, in accordance with embodiments of the disclosure.

FIG. 4 is an illustration of an example of a computing system 400 for garbage collection overhead mitigation in accordance with embodiments of the present disclosure. System 400 includes a processing device 410 and a memory 420. Processing device 410 be the same or similar to processing device 160 of FIG. 1 and memory 420 may be the same or similar to memory 170 of FIG. 1. The computing system 400 may include or be coupled to an execution environment such as a container 430. The processing device 410 may execute a statistics collection component 412, a function call identifier 414, and a resource determination component 416. In some examples, an application 434 may execute within container 430 with a particular amount of resources allocated to the container indicated by resource allocation 432. The container 430 may utilize the resources provided by the resource allocation 432 to execute the application 434.

In some examples, the statistics collection component 412 may collect resource utilization information and statistics of the container 430 during execution of the application 434. For example, the statistics collection component 412 may monitor the amount of memory, the number of processing cycles, and the amount of cache used by the application 434 as the application 434 executes. The function call identifier 414 may identify and monitor garbage collection function calls from the application 434 to an operating system to clear memory for the application 434. In some examples, the function call identifier 414 may record and export the garbage collection function calls to the resource determination component 416. The resource determination component 416 may then determine whether the resource allocation 432 is to be updated based on the utilization statistics from the statistics collection component 412 and the garbage collection function calls identified by the function call identifier 414. For example, the resource determination component 416 may determine that the resource allocation 432 is to be updated if a pattern of the garbage collection function calls appear similar to example cases (e.g., training data) with patterns that are known to indicate a resource shortage or limitation. In another example, the resource determination component 416 may determine that the garbage collection function calls occur at a threshold frequency (e.g., a threshold number within a time period) or last for more than a threshold amount of time. In some examples, the resource determination component 416 also filters patterns or garbage collection function calls that occur when the resource utilization statistics indicate low resource usage by the application 434 relative to the resource allocation 432. The resource determination component 416 may then provide a recommended resource allocation or automatically update the resource allocation 432 based on the recommended allocation to optimize performance of the application 434.

FIG. 5 is a flow diagram of a method 500 of method of resource allocation adjustment for mitigating garbage collection overhead, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by execution tracer 115 and/or analysis component 118 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 800. It is appreciated that the blocks in method 500 may be performed in an order different than presented, and that not all of the blocks in method 500 may be performed.

Method 500 begins at block 510, where the processing logic collects resource utilization statistics associated with execution of an application. The resource utilization statistics may include the amount of computing resources consumed by an application during execution of the application (e.g., processing resources, memory, cache, network usage, etc.)

At block 520, the processing logic identifies calls to a function associated with management of the application. In some examples, the function is a garbage collection function to identify and free up memory for use by other process or tasks of an application. In some examples, the processing logic may correlate the resource utilization statistics and the calls to the garbage collection function together. For example, the processing logic may determine and correlate the resource utilization statistics and garbage collection calls in a time domain. Accordingly, the processing logic may determine whether the garbage collection function calls indicate a resource limitation at the same time that the resource utilization statistics of the application indicate a high usage. Thus, garbage collection calls that may otherwise indicate a resource limitation may be filtered out if the corresponding usage of the resources indicated by the statistics are low.

At block 530, the processing logic adjusts allocation of computing resources for executing the application in view of the resource utilization statistics and the calls to the function. For example, the processing logic may determine whether to adjust an amount of memory or CPU cycles allocated to a container in view of the function calls, the resource utilization statistics or a combination of the function calls and utilization statistics. In some examples, the processing logic may adjust the allocation of computing resources in view of the correlation between the function calls and the utilization statistics.

In some examples, the processing logic determines whether to adjust the allocation of memory to executing the application if a threshold number of function calls have occurred within a particular period of time. For example, if more than five garbage collection calls have occurred within thirty seconds then the memory allocated to the application may need to be increased. The high use of memory causes the large number of garbage collection calls, thus indicating that the memory allocation should be increased.

In some examples, the processing logic may determine to adjust the number of processing cycles allocated to executing the application if the time it takes to complete the garbage collection calls is more than a threshold amount of time. For example, if a garbage collection function call takes more than a minute to execute then the processing cycles should be increased. The larger amount of time to perform the garbage collection function call may be due to a limited number of processing cycles available to perform the garbage collection function in a timely manner. Thus, the processing logic may be able to identify and adjust resource allocation for executing an application or workload based on the pattern of garbage collection calls.

FIG. 6 is a flow diagram of a method 600 of recommending resource allocation to mitigate garbage collection overhead, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by analysis component 118 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic receives statistics associated with execution of an application. The statistics may include utilization of computing resources that are allocated to executing the application. For example, the statistics may include an amount of memory, processing cycles (e.g., CPU cycles), network bandwidth, or any other computing resources that are consumed throughout execution of the application. In some examples, the statistics are collected by an autoscaler of a cloud computing system. The statistics may be exported to the processing logic with an identifier of the application or execution environment of the application. In some examples, the application is executed within a container or other virtualized execution environment such a virtual machine, pod, service, etc.

At block 620, the processing logic receives a pattern of garbage collection function calls during execution of the application. The pattern of garbage collection function calls may include the time at which the function calls were made, the frequency of garbage collection, function calls, and the length of time each call took to complete. In some examples, the garbage collection function calls are monitored and exported to the processing logic (e.g., analysis component) in real time. In some examples, the garbage collection function calls are exported to the processing logic periodically.

At block 630, the processing logic determines a recommended resource allocation in view of the statistics and pattern of garbage collection function calls. For example, the processing logic may determine whether the pattern of garbage collection function calls and the resource utilization statistics indicate that the computing resources allocated to the application or container of the application should be updated to improve performance of the application, as described above. The processing logic may then provide the recommended resource allocation to the container orchestration system or other management system to update the allocated resources. In another example, the processing logic automatically updates the resource allocation of the container. In some examples, the processing logic may evict the container and start a new container with the recommended resource allocation to execute the application.

FIG. 7 is a flow diagram of a method 700 of collecting information for mitigating garbage collection overhead, in accordance with some embodiments. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by execution tracer 115 of FIG. 1.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic collects resource usage statistics during execution of an application. In some examples, the application executes within a virtualized execution environment such as a VM or a container. In some examples, the application is a cloud-native application. The resource usage statistics may be collected by a pod autoscaler that collects resource information from executing containers and pods in a serverless or cloud-native execution environment.

At block 720, the processing logic monitors garbage collection calls during execution of the application. In some examples, a tracer (e.g., based on eBPF) may be provided between the operating system and an application (e.g., application container) executing on the operating system. The tracer may identify and record garbage collection calls from the application to the operating system. The tracer may record a timestamp and the length of time taken to perform the garbage collection call (e.g., when the operating system returns to the application that the garbage collection call is complete).

At block 730, the processing logic exports the statistics and garbage collection calls to an analysis component, wherein the analysis component is to determine a recommended resource allocation for the application in view of the statistics and the garbage collection calls. As described above, the analysis component may determine whether the garbage collection calls indicate a shortage of memory, processing cycles, or cache availability.

FIG. 8 is a flow diagram of a method 800 of mitigating garbage collection overhead by recommending resource allocation based on garbage collection call information, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by execution tracer 115 and/or analysis component 118 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic probes resource utilization statistics of a container executing an application. At block 820, the processing logic monitors garbage collection calls during execution of the application. At block 830, the processing logic correlates the statistics and the garbage collection calls together with an identifier of the application. At block 840, the processing logic identifies a pattern of the garbage collection calls in relation to the utilization statistics. At block 850, the processing logic determines a recommended resource allocation for the container to execute the application based on the utilization statistics and the pattern of garbage collection calls. At block 860, the processing logic updates the container with the recommended resource allocation.

Figure 9:
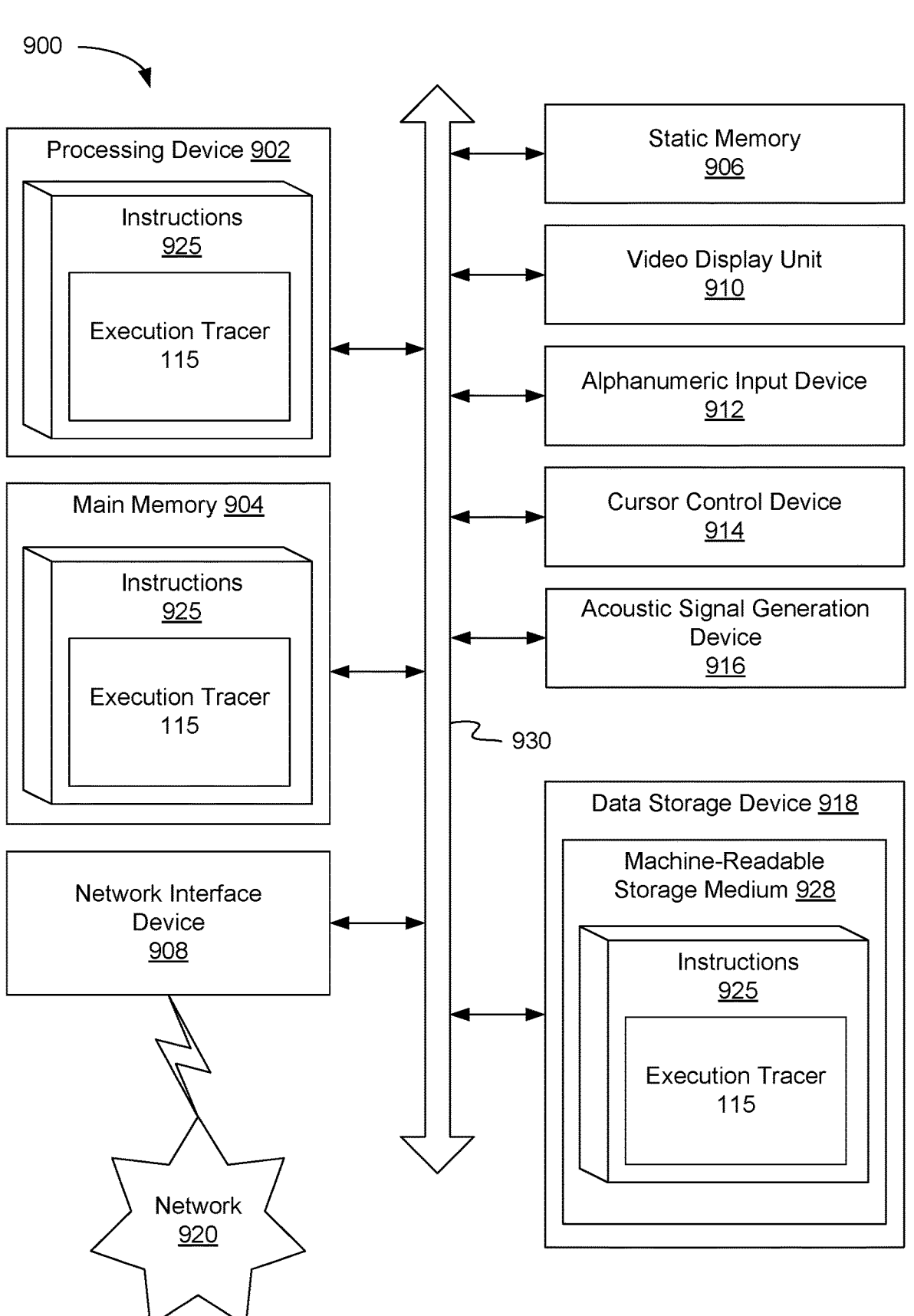
FIG. 9 is a block diagram of an example apparatus that may perform one or more of the operations described herein, in accordance with some embodiments of the present disclosure.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also include one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 925 that may include instructions for an execution tracer and an analysis component, e.g., execution tracer 115 and/or analysis component 118, for carrying out the operations described herein, in accordance with one or more aspects of the present disclosure. Instructions 925 may also reside, completely or at least partially, within main memory 904 and/or within processing device 902 during execution thereof by computing device 900, main memory 904 and processing device 902 also constituting computer-readable media. The instructions 925 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method including collecting resource utilization statistics associated with execution of an application, identifying, by a processing device, calls to a function associated with management of the application, and adjusting, by the processing device, an allocation of computing resources for executing the application in view of the resource utilization statistics and the calls to the function.

Example 2 is the method of Example 1, further including correlating the resource utilization statistics and the calls to the function and adjusting the allocation of computing resources in view of the correlation.

Example 3 is the method of any of Examples 1-2, wherein the function comprises a garbage collection process.

Example 4 is the method of any of Examples 1-3, further including determining, in view of the calls to the function, whether to adjust an amount of memory allocated to the application.

Example 5 is the method of any of Examples 1-4, wherein determining whether to adjust the amount of memory is in response to determining that a threshold number of the calls to the function have occurred within a defined period of time.

Example 6 is the method of any of Examples 1-5, further including determining, in view of the calls to the function, whether to adjust an amount of processing cycles provided for execution of the application.

Example 7 is the method of any of Examples 1-6, wherein determining whether to adjust the amount of processing cycles is in response to determining that the calls to the function take more than a threshold amount of time to complete.

Example 8 is a system comprising: a memory; and a processing device, operatively coupled to the memory, to: collect resource utilization statistics associated with execution of an application, identify, by a processing device, calls to a function associated with management of the application, and adjust, by the processing device, an allocation of computing resources for executing the application in view of the resource utilizations statistics and the calls to the function.

Example 9 is the system of Example 8, wherein the processing device is further to correlate the resource utilization statistics and the calls to the function and adjust the allocation of computing resources in view of the correlation.

Example 10 is the system of any of Examples 8-9, wherein the function comprises a garbage collection process.

Example 11 is the system of any of Examples 8-10, wherein the processing device is further to determine, in view of the calls to the function, whether to adjust an amount of memory allocated to the application.

Example 12 is the system of any of Examples 8-11, wherein the processing device is to determine whether to adjust the amount of memory in response to determining that a threshold number of the calls to the function have occurred within a defined period of time.

Example 13 is the system of any of Examples 8-12, wherein the processing device is further to determine, in view of the calls to the function, whether to adjust an amount of processing cycles provided for execution of the application.

Example 14 is the system of any of Examples 8-13, wherein the processing device is to determine whether to adjust the amount of processing cycles in response to determining that the calls to the function take more than a threshold amount of time to complete.

Example 15 is a non-transitory computer-readable storage medium including instructions that, when executed by a processing device, cause the processing device to: collect resource utilization statistics associated with execution of an application, identify, by the processing device, calls to a function associated with management of the application, and adjust, by the processing device, an allocation of computing resources for executing the application in view of the resource utilization statistics and the calls to the function.

Example 16 is the non-transitory computer-readable storage medium of Example 15, wherein the processing device is further to: correlate the resource utilization statistics and the calls to the function and adjust the allocation of computing resources in view of the correlation.

Example 17 is the non-transitory computer-readable storage medium of any of Examples 15-16, wherein the function comprises a garbage collection process.

Example 18 is the non-transitory computer-readable storage medium of any of Examples 15-17, wherein the processing device is further to determine, in view of the calls to the function, whether to adjust an amount of memory allocated to the application.

Example 19 is the non-transitory computer-readable storage medium of any of Examples 15-18, wherein the processing device is to determine whether to adjust the amount of memory in response to determining that a threshold number of the calls to the function have occurred within a defined period of time.

Example 20 is the non-transitory computer-readable storage medium of any of Examples 15-19, wherein the processing device is further to determine, in view of the calls to the function, whether to adjust an amount of processing cycles provided for execution of the application.

Example 21 is a method including monitoring calls to a garbage collection function during execution of an application, determining, by a processing device, a pattern associated with the calls to the garbage collection function, and updating, by the processing device, an allocation of computing resources for executing the application in view of the pattern of calls to the garbage collection function.

Example 22 is the method of any one of Examples 20-21, wherein the application is executed within a container.

Example 23 is the method of any one of Examples 20-22, further including updating an amount of memory allocated to the application in response to the pattern of calls to the garbage collection indicating a shortage of memory.

Example 24 is the method of any one of Examples 20-23, further including updating an amount of processing cycles allocated to the application in response to the pattern of calls to the garbage collection function indicating a shortage of processing cycles.

Example 25 is the method of any one of Examples 20-24, wherein the pattern comprises a frequency of the calls to the garbage collection function.

Example 26 is the method of any one of Examples 20-25, wherein the pattern comprises time taken to complete the calls to the garbage collection function.

Example 27 is a system including a memory and a processing device, operatively coupled to the memory, the processing device to receive statistics associated with execution of an application, receive a pattern of garbage collection function calls during execution of the application and determine a recommended resource allocation in view of the statistics and pattern of garbage collection function calls.

Example 28 is the system of Example 27, wherein the application is executed within a container.

Example 29 is the system of any of Examples 27-28, wherein the processing device is further to update the container with the recommended resource allocation.

Example 30 is the system of any of Examples 27-29, wherein to update the container with the recommended resource allocation, the processing device is to evict the container and start a new container with the recommended resource allocation to execute the application.

Example 31 is the system of any of Examples 27-30, wherein the statistics include one or more of memory utilization, processor utilization, or cache utilization.

Example 32 is a non-transitory computer-readable storage medium including instructions that, when executed by a processing device, cause the processing device to collect resource usage statistics during execution of an application, monitor garbage collection calls during execution of the application, and export the statistics and garbage collection calls to an analysis component, wherein the analysis component is to determine a recommended resource allocation for the application in view of the statistics and the garbage collection calls.

Example 33 is the non-transitory computer-readable storage medium of any of Examples 32, wherein the application is a cloud native application.

Example 34 is the non-transitory computer-readable storage medium of any of Examples 32-33, wherein the analysis component is further to determine a pattern associated with the garbage collections calls and determine the recommended resource allocation in view of the pattern.

Example 35 is the non-transitory computer-readable storage medium of any of Examples 32-34, wherein the processing device is further to correlate the statistics and garbage collection calls with an identifier of the application.

Example 36 is an apparatus including means for collecting resource utilization statistics associated with execution of an application, means for identifying calls to a function associated with management of the application, and means for adjusting an allocation of computing resources for executing the application in view of the resource utilizations statistics and the calls to the function.

Example 37 is the apparatus of Example 36, further including means for correlating the resource utilization statistics and the calls to the function and means for adjusting the allocation of computing resources in view of the correlation.

Example 38 is the apparatus of any of Examples 36-37, wherein the function comprises a garbage collection process.

Example 39 is the apparatus of any of Examples 36-38, further including means for determining, in view of the function calls, whether to adjust an amount of memory allocated to the application.

Example 40 is the apparatus of any of Examples 36-39, wherein the means for determining to adjust the memory includes means for determining that a threshold number of function calls have occurred within a defined period of time.

Example 41 is the apparatus of any of Examples 36-40, further including means for determining, in view of the function calls, whether to adjust an amount of processing cycles provided for execution of the application.

Example 42 is the apparatus of any of Examples 36-41, wherein the means for determining to adjust the processing cycles includes means for determining that the function calls take more than a threshold amount of time to complete.

Unless specifically stated otherwise, terms such as "collecting," "identifying," "adjusting," "correlating," "determining," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
collecting, within a defined period of time, resource utilization statistics associated with execution of an application;
monitoring, by a processing device within the defined period of time, calls to a function associated with management of the application during execution of the application, wherein the function comprises a garbage collection process;
determining a threshold number of calls to the function have occurred within the defined period of time;
determining a pattern of calls to the function within the defined period of time;
comparing the pattern of calls to the function within the defined period of time to resource utilization statistics for the defined period of time; and
updating, by the processing device, an allocation of computing resources for executing the application in view of the resource utilization statistics, the calls to the function, the threshold number of calls occurring within the defined period of time, and comparison of the pattern of calls to the function within the defined period of time to the resource utilization statistics for the defined period of time, wherein updating the allocation of computing resources includes determining whether to adjust an amount of memory allocated to the application in response to determining that the threshold number of calls to the function have occurred within the defined period of time.

2. The method of claim 1, further comprising:
correlating the resource utilization statistics and the calls to the function; and
adjusting the allocation of computing resources in view of the correlation.

3. The method of claim 1, further comprising:
determining, in view of the calls to the function, whether to adjust an amount of processing cycles provided for execution of the application.

4. The method of claim 3, wherein determining whether to adjust the amount of processing cycles is in response to determining that the calls to the function take more than a threshold amount of time to complete.

5. A system comprising:
a memory; and
a processing device, operatively coupled to the memory, to:
collect, within a defined period of time, resource utilization statistics associated with execution of an application;
monitor, by a processing device within the defined period of time, calls to a function associated with management of the application during execution of the application, wherein the function comprises a garbage collection function; and
determine a threshold number of calls to the function have occurred within the defined period of time;
determine a pattern of calls to the function within the defined period of time;
compare the pattern of calls to the function within the defined period of time to the resource utilization statistics for the defined period of time; and
adjust, by the processing device, an allocation of computing resources for executing the application in view of the resource utilization statistics, the calls to the function, the threshold number of calls occurring within the defined period of time, and comparison of the pattern of calls to the function within the defined period of time to the resource utilization statistics for the defined period of time, wherein updating the allocation of computing resources includes determining whether to adjust an amount of memory allocated to the application in response to determining that the threshold number of calls to the function have occurred within the defined period of time.

6. The system of claim 5, wherein the processing device is further to:
correlate the resource utilization statistics and the calls to the function; and
adjust the allocation of computing resources in view of the correlation.

7. The system of claim 5, wherein the processing device is further to:
determine, in view of the calls to the function, whether to adjust an amount of processing cycles provided for execution of the application.

8. The system of claim 7, wherein the processing device is to determine whether to adjust the amount of processing cycles in response to determining that the calls to the function take more than a threshold amount of time to complete.

9. A non-transitory computer-readable storage medium including instructions that, when executed by a processing device, cause the processing device to:
collect, within a defined period of time, resource utilization statistics associated with execution of an application;
monitor, by the processing device within the defined period of time, calls to a function associated with management of the application during execution of the application, wherein the function comprises a garbage collection function;
determine a threshold number of calls to the function have occurred within the defined period of time;
determine a pattern of calls to the function within the defined period of time;

compare the pattern of calls to the function within the defined period of time to the resource utilization statistics for the defined period of time; and updating, by the processing device, an allocation of computing resources for executing the application in view of the resource utilization statistics, the calls to the function, the threshold number of calls occurring within the defined period of time, and comparison of the pattern of calls to the function within the defined period of time to the resource utilization statistics for the defined period of time, wherein updating the allocation of computing resources includes determining whether to adjust an amount of memory allocated to the application in response to determining that the threshold number of calls to the function have occurred within the defined period of time.

10. The non-transitory computer-readable storage medium of claim 9, wherein the processing device is further to:

correlate the resource utilization statistics and the calls to the function; and adjust the allocation of computing resources in view of the correlation.

11. The non-transitory computer-readable storage medium of claim 9, wherein the processing device is further to:

determine, in view of the calls to the function, whether to adjust an amount of processing cycles provided for execution of the application.

12. The non-transitory computer-readable storage medium of claim 11, wherein determining whether to adjust the amount of processing cycles is in response to determining that the calls to the function take more than a threshold amount of time to complete.

13. The non-transitory computer-readable storage medium of claim 9, wherein the application is executed within a container.

14. The non-transitory computer-readable storage medium of claim 9, wherein the resource utilization statistics include at least one of memory utilization processor utilization, or cache utilization.

15. The method of claim 1, wherein the application is executed within a container.

16. The method of claim 1, wherein application is a cloud native application.

17. The method of claim 1, wherein the resource utilization statistics include at least one of memory utilization processor utilization, or cache utilization.

18. The system of claim 5, wherein the application is executed within a container.

19. The system of claim 5, wherein application is a cloud native application.

20. The system of claim 5, wherein the resource utilization statistics include at least one of memory utilization processor utilization, or cache utilization.

* * * * *